United States Patent
Gandhi et al.

(10) Patent No.: US 11,271,982 B2
(45) Date of Patent: *Mar. 8, 2022

(54) SYSTEMS AND METHODS FOR DETERMINING PORTIONS OF MEDIA ASSETS FOR IMMEDIATE RETRIEVAL BY MULTIPLE DEVICES

(71) Applicant: Rovi Guides, Inc., San Jose, CA (US)

(72) Inventors: Gaurav Gandhi, Bengaluru (IN); Kuppappa Harijan, Bengaluru (IN); Siddhartha Pande, Bengaluru (IN); Deviprasad Punja, Bangalore (IN); Madhusudhan Srinivasan, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 16/871,642

(22) Filed: May 11, 2020

(65) Prior Publication Data

US 2021/0014290 A1  Jan. 14, 2021

Related U.S. Application Data

(63) Continuation of application No. 16/510,783, filed on Jul. 12, 2019, now Pat. No. 10,686,858.

(51) Int. Cl.
| | |
|---|---|
| *G06F 15/16* | (2006.01) |
| *H04L 65/60* | (2022.01) |
| *H04W 4/80* | (2018.01) |
| *H04B 17/318* | (2015.01) |

(52) U.S. Cl.
CPC ........... *H04L 65/60* (2013.01); *H04B 17/318* (2015.01); *H04W 4/80* (2018.02)

(58) Field of Classification Search
CPC ........ H04L 65/60; H04L 67/06; H04L 67/303
See application file for complete search history.

(56) References Cited

U.S. PATENT DOCUMENTS

| | | | |
|---|---|---|---|
| 10,686,858 B1 * | 6/2020 | Gandhi | H04N 21/8456 |
| 2009/0063301 A1 | 3/2009 | Ward | |
| 2010/0071070 A1 | 3/2010 | Jawa | |
| 2014/0094140 A1 | 4/2014 | Misra | |
| 2017/0303166 A1 | 10/2017 | Abuelsaad | |
| 2017/0374320 A1 | 12/2017 | May | |

* cited by examiner

*Primary Examiner* — Yves Dalencourt
(74) *Attorney, Agent, or Firm* — Haley Guiliano LLP

(57) ABSTRACT

Systems and methods are disclosed for determining portions of media assets for cooperative reception by multiple devices. The disclosed techniques herein include identifying cooperating devices that are able to communicate with a selected device for relaying portions of a media asset. For example, a group of people each travelling together in a vehicle may wish to view a media asset by cooperatively using their network resources of their smartphones to relay portions of the media asset for viewing. Network service data for each of the plurality of cooperating devices is then received. Based on the network service data, a determination is made for each cooperating device regarding reception of a respective portion of the media asset to each cooperating device. Instructions to receive and relay the respective portions of the media asset are transmitted to each cooperating device.

15 Claims, 8 Drawing Sheets

500

SYSTEMS AND METHODS FOR DETERMINING PORTIONS OF MEDIA ASSETS FOR IMMEDIATE RETRIEVAL BY MULTIPLE DEVICES

CROSS-REFERENCE TO RELATED APPLICATIONS

This application is a continuation of U.S. patent application Ser. No. 16/510,783, filed Jul. 12, 2019. The disclosure of which is hereby incorporated by reference herein in its entirety.

FIELD OF INVENTION

The present disclosure includes methods and systems for receiving a media asset, and more particularly, determining portions of media assets for reception by multiple devices.

BACKGROUND

The download or streaming of a media asset wirelessly to a device relies on signal strength at the device and continuity of service during the transmission. Various external factors may impact these criteria, especially if the device is mobile and moving. If the device is in an area of poor signal strength, the bitrate and integrity of the service can suffer. When this happens, the device is limited in the types of operations it can perform reliably with respect to receiving media assets. For example, a device in an area of poor signal strength may not be able to stream video at a sufficiently high bitrate. Even if signal strength was known to vary in a predictable way so that problems along a travel route could be anticipated, the device would be solely responsible for buffering the entire media asset. This is time intensive (e.g. in the example used above, it may take too long to buffer a high bitrate video before the device has moved out of the area of good signal coverage) and the device remains exposed to a degraded service.

SUMMARY

Accordingly, techniques are disclosed herein for the cooperative reception of a media asset by multiple devices. The disclosed techniques herein include identifying cooperating devices that are able to communicate with a selected device for relaying portions of a media asset. For example, a group of people each travelling together in a vehicle may wish to view a media asset by cooperatively using their network resources of their smartphones to relay portions of the media asset for viewing. Network service data for each of the plurality of cooperating devices is then received. Based on the network service data, a determination is made for each cooperating device regarding reception of a respective portion of the media asset to each cooperating device. Instructions to receive and relay the respective portions of the media asset are transmitted to each cooperating device.

Techniques are disclosed herein for determining of respective portions of a requested media asset among cooperating devices is based on a common route being traveled by the devices together. In one embodiment, network service data is accessed for each of the cooperating devices. A determination is made of whether the signal strength of a first device of the cooperating devices exceeds a threshold of a minimum signal strength. If the threshold is met or exceeded, the first device is designated as the primary device. The primary device receives the respective portion of the media asset during part of the common route being travelled. In other embodiments, a determination is made of signal strength for each of the cooperating devices during a further part of the common route (e.g. an intermediate portion of a travel route). Based on the determined signal strength during the further part of the common route, a determination is made of whether the signal strength of a first device of the cooperating devices exceeds a threshold of a minimum signal strength. If the threshold is met or exceeded, the first device is designated as the primary device. The primary device receives the respective portion of the media asset during the further part of the common route being travelled.

In some embodiments, the portions of the media asset are received in at least partially temporally overlapping order by two or more of the cooperating devices as primary devices.

In other embodiments, one of the cooperating devices, for example the selected device, controls the other devices with which it is cooperating, monitors its service provider signal strength and instructs one of the other coopering devices to act as the primary device as and when its service signal strength falls below a service acceptable threshold at least while the selected device is unable to receive the media asset. In this form the cooperation is ad hoc and responds to service events rather than being predictive of the quality of service along a common travel route. This event driven embodiment is applicable to different moving scenarios including, for example, a journey in an automobile not having a pre-defined route.

The techniques disclosed herein may be used to efficiently and more reliably receive a media asset based on an analysis of signal strength among cooperating devices. For example, the media asset may be allocated among the cooperating devices in accordance with network service data. For example, cooperating devices in close proximity (e.g. a group of people each having smartphones travelling together in a vehicle) may be configured to each receive respective portions of a media asset either in sequence, in an overlapping order, or simultaneously using their own respective network connections. These received portions are sent to a selected device for playback, to thereby mitigate any download/streaming support inadequacies in network coverage along the travel route.

BRIEF DESCRIPTION OF THE DRAWINGS

Various objects and advantages will be apparent upon consideration of the following detailed description, taken in conjunction with the accompanying drawings, in which like reference characters refer to like parts throughout, and in which.

DETAILED DESCRIPTION

The reception of the media asset by the cooperating devices is in response to a user request. One of the cooperating users on a common journey with users of other devices initiates a request to download or stream a media asset utilising the service in which the reception of the transmitted media asset is shared among multiple cooperating devices on the journey. The request from the user is received by a network optimizer with access to the requested content. The network optimizer designates the requesting device as a selected device for displaying the media content requested and selects a plurality of devices within a proximity of a selected device for receiving portions of the media asset. In an alternative form, the network optimizer does not have to use the requesting device as the selected device but may poll the cooperating devices for a device having the best or acceptable playback capabilities and nominates that device as the selected device for playback instead. In a further alternative the requesting device can also specify another device among the cooperating devices or not (i.e. the selected device may not have network capacities but can communicate locally with the cooperating devices), to be the selected device. The implementation of the procedure can be embodied in an application downloaded by the user to his/her device.

Figure 1:
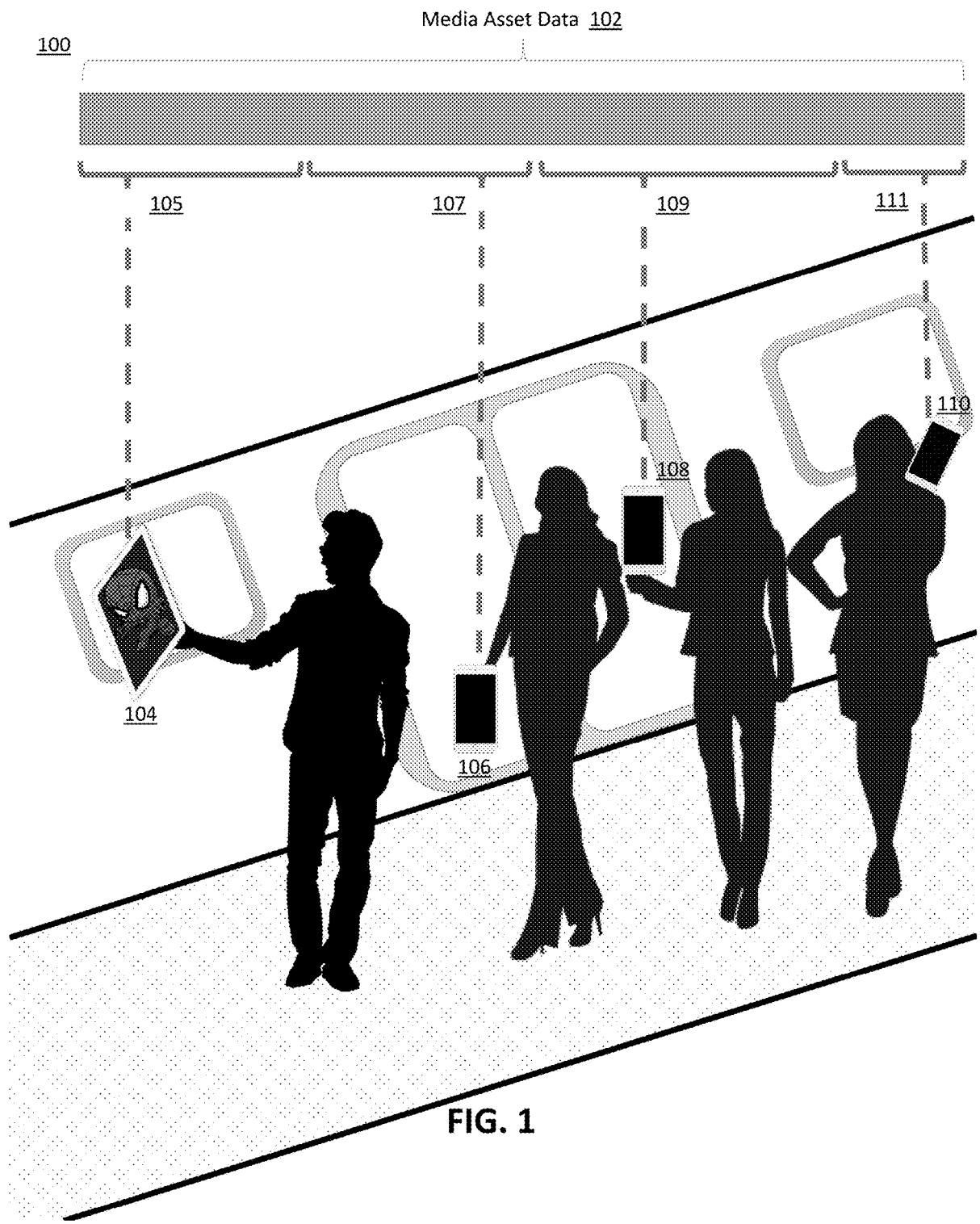
FIG. 1 is a diagram illustrating how portions of a media asset for cooperative reception by multiple devices can be determined, in accordance with some embodiments.

As an illustrative example shown in FIG. 1, a number of people, each with a respective network-enabled device, are travelling from one place to another. For example, it may be a train carrying commuters home from work. An individual on the train with a mobile tablet device 104 loaded with the application selects Spiderman® as a media asset 102 to be played during the journey according to a specific request via the application to the network optimizer for cooperative reception on multiple devices within range of the requesting device. In other embodiments, the cooperative reception on multiple devices within range of the requesting device is automatically enabled upon selection of the media asset via the application. The individual's fellow commuters travelling with him on the same train, and thus on the same journey, are all keen to view the media asset. Each of the commuters has their own personal smartphone 106, 108, and 110, respectively. The Spiderman® media asset 102 can be considered as made up of multiple respective portions (e.g. 105, 107, 109, and 111), which collectively constitute the full media asset. In response to the request from the selected device 104, the network optimizer determines which portions of Spiderman® should be received by corresponding devices based on factors including network coverage along the common travel route. In this way, each of the people wishing to participate in the viewing of Spiderman® on the selected device can pool their network resources to receive the media asset for immediate consumption, thereby circumventing potential network service failures which typically occur along a common travel route, and avoiding such things as buffer underrun and/or other reception disruptions.

In this example, in response to the request from the selected device the network optimizer, which may be cloud-based, implemented on a server accessed over the selected device's network or resident on the selected device as part of the downloaded application, selects devices within a proximity of the selected device. In this example, the selected device is the mobile tablet 104 as this is the device that made the request for the media asset and will generate the Spiderman® media asset for display. In some embodiments, the selected device may be another device selected from the plurality of devices once the plurality of cooperating devices has been identified by the network optimizer as described below.

The cooperating devices in the proximity of the selected device may be determined by any of a number of techniques disclosed herein. In one embodiment, the network optimizer instructs the selected device to send a signal to each of the devices in the vicinity of the selected device requesting each of the devices to accept or reject being part of the cooperating network for receiving the media asset. In some embodiments, the devices may be determined by a maximum range of a secondary communication network around the selected device. For example, if the mobile tablet 104 and smartphones 106, 108, and 110 all have Bluetooth network communication capability, the Bluetooth range itself may determine the devices in the useful proximity of the selected device. The secondary communication network may be any other wireless protocol, such as Near Field Communication, Bluetooth, ad-hoc wireless service, or other service provider proprietary network, or be a wired connection between the devices.

In some embodiments, further filtering may be implemented to select the cooperating devices within the proximity of the selected device. For example, in a further filtering technique, the devices may also be previously associated (e.g. as known contacts of the device, or from previous connection history) in addition to being within the proximity of the selected device. Alternatively, the cooperating devices may be part of the set-up in the downloaded application by which the user adds contact details for the devices of colleagues. The network optimizer uses the contact details of the group set up by the user on the assumption that all or some of the other devices will be in range at the time of a request. The network optimizer then contacts the devices found to be in range or instructs the selected device to send accept/reject requests to those devices in range of the selected device. For example, if all the devices are work devices, then it is likely that work colleagues may have contact information of their colleagues within their devices. The contact information may be used as a filtering technique to select only the work colleagues by virtue of the contact details being on the selected device and not other passengers on the train that are within range of the Bluetooth area of the selected device.

The network optimizer may obtain network service data based on a common travel route identified to it by one of the devices, for example the requesting device. For example, in making the request for the media asset, the selected device sends data on a pre-designated route to be followed by the devices, such as the exemplary train journey. From this route data the network optimizer can assess the network capabilities associated with the route. In some embodiments, network service data is accessed from a data structure. In some embodiments, the data structure may be embedded within the network optimizer. In other embodiments, the data structure may be non-local, for example associated with the network service providers, and coupled to the network optimizer via a communications network. Each of the smartphones 106, 108, and 110 along with the tablet 104 will have its own reception capabilities and network service profile based on different service providers. Each of these devices may provide the network optimizer with real-time, statistical and/or historical network service information about its network coverage. Alternatively, if, for example, one of the smartphones is operating on TelCo Network A, the smartphone may receive the current network coverage information from a data structure associated with TelCo Network A. In other embodiments, the network optimizer has an internal data structure which stores information on network and/or cellular communication providers and the network service data is retrieved from the data structure within the network optimizer.

As mentioned above, route selection data may be provided by one of the plurality of devices, for example the selected device. Route selection data from the device is received by the network optimizer. The network optimizer needs only one device to provide the route selection data, as all parties are travelling along the same route. The route selection data may be provided by sharing navigational information from a navigation application (which may use GPS route data) with the application used by the selected device for cooperative reception on multiple devices. The navigational information may include the current position of the selected device (and/or other device), start and end destinations, projected route, and alternative routes. Other information from the devices may also be shared with the network optimizer. In the absence of location details, the network optimizer may use other available information to determine the location, such as network service data, from which the location of the device can be derived. Alternatively, the network optimizer may determine that a calendar appointment for one of the devices has an associated venue with location details. The network optimizer may then determine route selection data based on the location details of the associated venue as a destination and the current position of the selected device (e.g. GPS information shared with the application) as the starting location.

In some variants of the disclosed embodiments, the network optimizer receives geographic event data from one or more data structures (e.g. weather databases, geographic social event databases, and/or geographic social network activity databases). For example, if a bus is passing through a location where a sizable crowd is gathered for a large-scale event (e.g. an outdoor concert holding 50,000 people), network coverage can be poor due to saturation of services by a high density of devices. The network optimizer, prior to entering the location, may receive information from a social network activity data structure, where the received information indicates that there are sizable crowds at the location, and traffic is severely congested along the common travel route. The network optimizer may then determine, via the application which may interface with a navigational application of the selected device, to alter the route selection data based on the received information from the social network activity database to an alternative route which avoids the location (and by extension the traffic congestion).

The network optimizer determines, for each cooperating device, a respective portion of the media asset for reception based on the network service data. Returning to FIG. 1, Spiderman® media asset 102 can be divided into portions 105, 107, 109, and 111. The network optimizer apportions the reception of the media asset such that devices 104, 106, 108, and 110 will receive portions 105, 107, 109, and 111 of the media asset, respectively, based on the quality of service available to each device along the route. The appropriate quality of service, i.e. the appropriate sustained signal strength for the streaming or downloading of a given portion coincident with a part of the route, will assist in determining the device to be used for that portion. As the reception of the asset portions has to be shared on a cooperative basis, the nomination of a device for a portion of the media asset may not correspond with that device being the best available (i.e. the greatest signal strength) but the designation may be balanced against the need for the reception to be shared among the devices such that the device nominated is overall the most appropriate.

In some embodiments, the network optimizer determines that the network signal strength from the coverage data for a first device of the plurality of devices exceeds the required threshold signal strength to support the streaming/download of the portion of the asset. For example, if the tablet 104 which is the selected device has network service data (e.g. real-time signal strength) that provides for smooth streaming (and/or download) of the Spiderman® media asset, then the network optimizer will select the tablet 104 as the default initial primary device. As the journey progresses the duty of primary device will be handed over to the other devices in turn as the media asset portions are required, and/or the various devices come into areas where their respective signal strengths become better and are anticipated to exceed the signal strength threshold. It is not essential that the reception of the media asset portions be in series. The network optimizer may determine that the management of the transmission of the media asset is better handled by transmitting two or more portions simultaneously to respective cooperating devices or at least in a temporally overlapping transmission to plural devices, depending on the constraints of the networks available based on the devices on the journey and the route taken. The primary device will provide one or more of the respective portions of the media asset at a time of playback of the media asset being generated for display on the selected device. The subsequent relay of the respective portions of the media asset streamed/downloaded to the devices when acting as primary devices to the selected device may be carried out via the secondary communication network (e.g. Bluetooth, Near Field Communication, service provider proprietary networks, or wired connection) or by wired connection to the selected device for generation for playback.

Thus the designation of the primary device will change as the portions of the media asset to be transmitted/received change. For example, going back to FIG. 1, at the start of Spiderman®, the tablet 104 or the otherwise nominated device is the primary device as it receives and provides the initial portion of the media asset 105 for generating playback. After, or while, this portion is received smartphone 106 becomes the primary device as designated by the network optimizer to receive the media asset portion 107 and provide it to the selected device 104 for generating playback at the appropriate time.

In some embodiments, if the network optimizer determines that the selected device is incapable of acting as the initial default primary device, it selects another device of the plurality of devices as the primary device in order to ensure that the reception of the first portion of the media asset can begin. For example, if the network coverage for the first device has poor signal strength below the threshold, a second cooperating device may be nominated as the initial primary device. This nomination of any device may be based on actual signal strength, statistical/historical data of signal strength for the route, and/or other network related metrics defining the ability of the device to support reception of the portion of the media asset. Alternatively, as mentioned above the network optimizer can automatically determine the first primary device as that with the highest signal strength (which may be actual or statistical) based on the obtained network service data corresponding to each of the plurality of devices.

In other embodiments, the network optimizer determines a corresponding travel segment, for each of the respective portions of the media asset, based on the received route selection. The travel segments are subsets of the route (e.g. geographical route/region) that the plurality of devices physically traverse during the estimated duration of the required time to receive the portions of the media asset to be streamed/downloaded. In some embodiments, the determination of the travel segments may be equally distributed by time (e.g. if a movie is two hours duration and there are four devices, each asset portion to be received can be 30 minutes long in playback, thereby substantially evenly sharing the load among four cooperating devices). In other embodiments, the determination of travel segments may be based on GPS data, speed of travel, and prevailing reception conditions. Continuing with the example in FIG. 1, the network optimizer determines that smartphone 106 should receive the subsequent media asset portion 107 based on the suitability of the network coverage in the region of the route in which the second portion of the media asset is anticipated to require streaming/downloading. For example, if the common travel route is segmented into separate geographic regions, the network optimizer may assess areas of different network coverage based on information received by the optimizer from the devices or statistical/empirical coverage data.

The network optimizer determines, for each of the respective travel segments, the signal strength available to each of the cooperating devices based on the received network service data. Thus, for the subsequent media asset portion 107, the network optimizer determines that smartphone 106 has a suitably high (for example the highest) signal strength of the cooperating devices (e.g. including devices 104, 108, and 110) for the specific travel segment associated with the anticipated period in which media asset portion 107 is required.

The network optimizer then determines assignments of the respective travel segments to the plurality of devices based on the determined or anticipated signal strengths available to each of the plurality of devices within the travel segments. For example, the network optimizer assigns each device to the travel segment for which it has the highest signal strength. In some embodiments, once an assignment is made by the network optimizer, that device is no longer available for future assignments for that media asset. In other embodiments, multiple devices may be assigned portions to download in the same or overlapping travel segments. For example, this may be advantageous if all devices have poor signal strength elsewhere in the route, such that a limited portion of the route is available in which to receive the portions of the media asset and thus the signal strength of a plurality of devices may be used to deliver an appropriate quality of service in the same region.

Upon determining the allocation of the respective portions of the media asset for reception based on the network service data for each device, the network optimizer transmits instructions corresponding to reception of the respective portion of the media asset to each device. Continuing with the previous example, the network optimizer transmits instructions to the devices 104, 106, 108, and 110 that each of the devices should begin to receive the media asset portions 105, 107, 109, and 111 respectively in series or in at least partially overlapping order depending on the coverage for each device, at specified points in the journey. As discussed, in some circumstances, the network optimizer may instruct the transmission and reception of plural portions of the media asset to multiple devices substantially simultaneously depending on the coverage assessment for the collection of cooperating devices during the journey. In some embodiments, communication between the network optimizer and the devices may be through a secondary communication network (e.g. Bluetooth, Near Field Communication (NFC), service provider proprietary networks) or wired connection.

Figure 2:
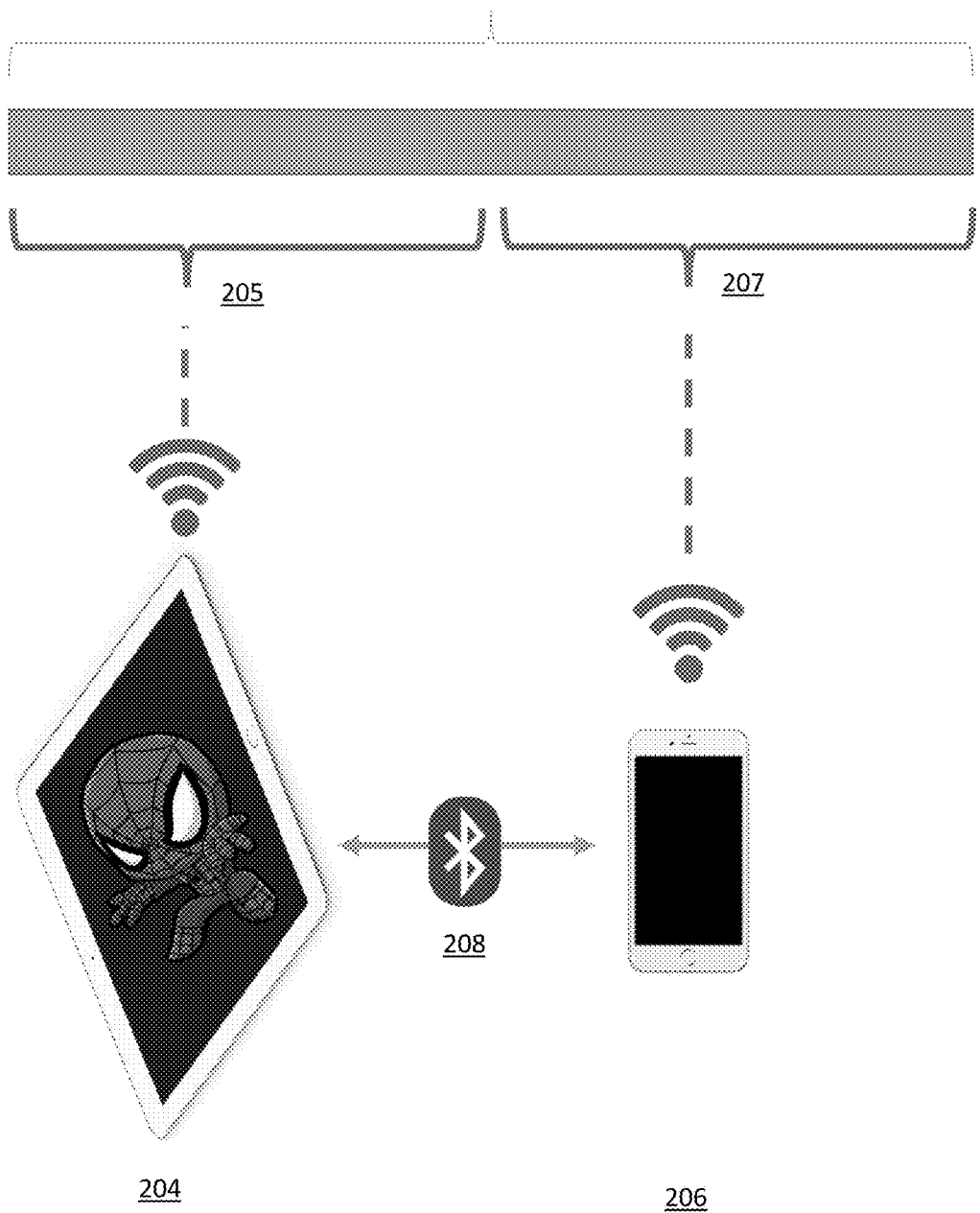
FIG. 2 is a diagram of determining portions of a media asset for reception by multiple devices, in accordance with some embodiments.

FIG. 2 is a diagram 200 for determining portions of media assets for cooperative reception by multiple devices, in accordance with some embodiments of the disclosure. This is a subset of FIG. 1 and focuses on the media asset 202 being portioned into two sections 205 and 207. The tablet 204 is designated the selected device for playback, having made the request. The first media asset portion received on the tablet 204 and the received second portions sent from each of the cooperating devices to the tablet 204 via Bluetooth 208 from the other devices are exemplified here by device 206. The portions may be sent to the selected device on an as-needed basis according to instructions from the network optimizer or the selected device, i.e., the portions are sent at the point when they are to be buffered in and displayed on the selected device, or the portions may be sent to the selected device from the other cooperating devices for storage on the selected device for playback. The generated instructions are transmitted by the network optimizer to each device of the plurality of devices, instructing it to relay the portions of the media asset to the selected device as necessary, using a communication network and/or secondary communication network. Continuing with the previous example, the network optimizer sends the instruction to each of the devices 104, 106, 108, and 110 to send the respective portions of the media asset to the tablet 104 (i.e., selected device) for display. The portions of the media asset are displayed on the selected device in sequence to reconstitute the media asset. In some embodiments, the network optimizer generates playback instructions for display on a device. These playback instructions include generating specific data for each of the devices which includes the respective portion of the media asset for reception.

Figure 3:
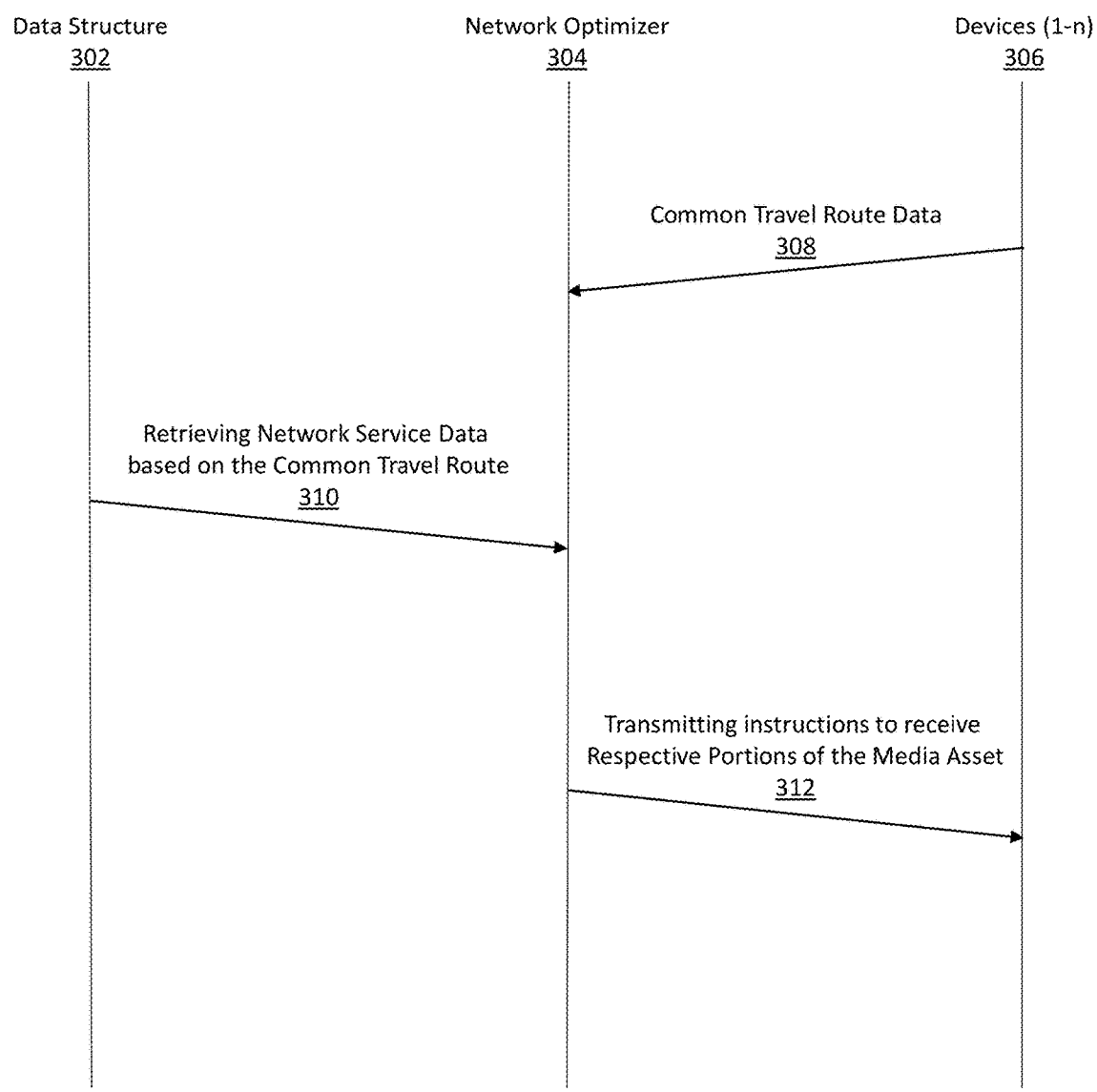
FIG. 3 is a data flow diagram including a data structure, network optimizer, and multiple devices, in accordance with some embodiments.

FIG. 3 is a data flow diagram 300 including a data structure 302, network optimizer 304, and multiple devices 306. The network optimizer 304 receives common travel route data 308 from one of the plurality of devices 306. Subsequent to a request by the network optimizer to the data structure, the network optimizer 304 receives network service data based on the travel route 310 which is transmitted from the data structure 302. The network optimizer determines, for each of the cooperating devices, a respective portion of the media asset for reception based on the network service data. The network optimizer 304 transmits instructions 312 corresponding to reception of a respective portion of the media asset to each device 306.

Figure 4:
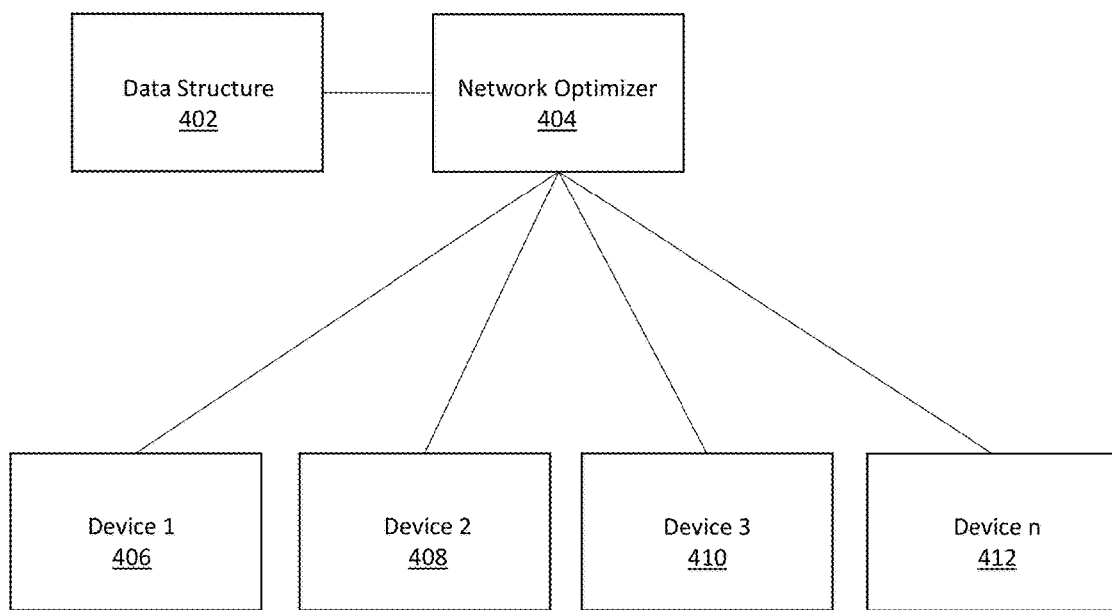
FIG. 4 is a system diagram of the network optimizer, data structure, and multiple devices, in accordance with some embodiments.
Figure 5:
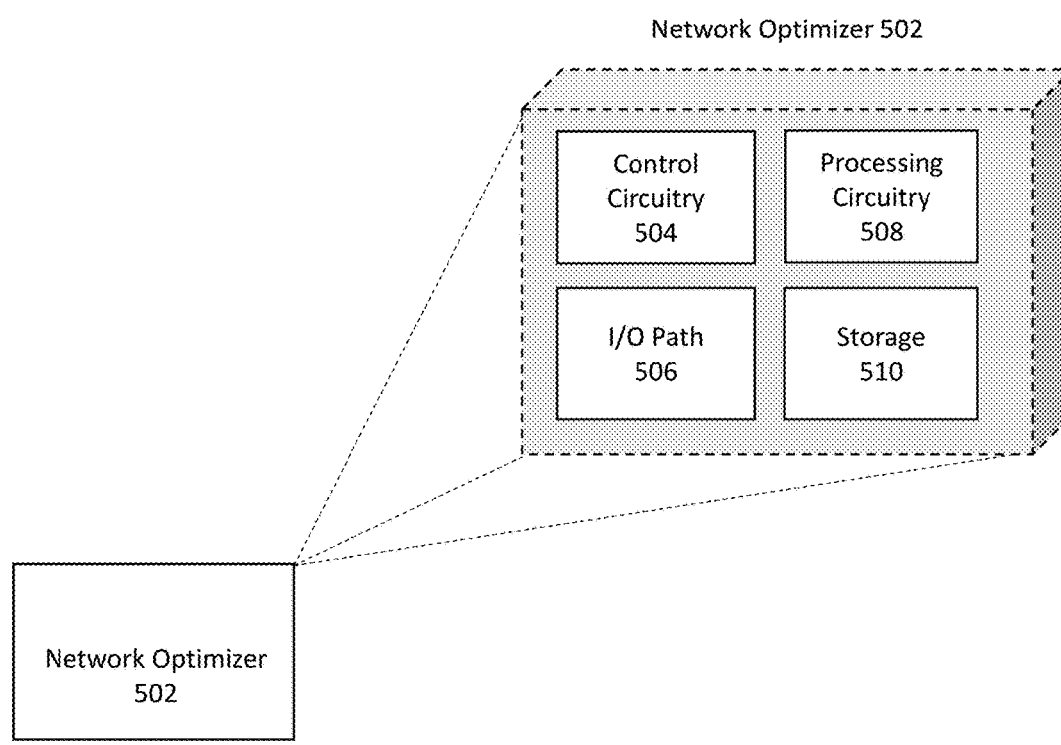
FIG. 5 is a block diagram of the network optimizer, in accordance with some embodiments.

FIG. 4 is a diagram 400 of the network optimizer, data structure, and multiple cooperating devices. The network optimizer 404 may be composed of any hardware that provides for processing and transmit/receive functionality. The network optimizer is communicatively coupled to multiple electronic devices (e.g. device 1 (406), device 2 (408), device 3 (410), and device n (412)). The network optimizer is communicatively coupled to the data structure 402. A further disclosure on the network optimizer can be seen in FIG. 5 showing a block diagram of the network optimizer, in accordance with some embodiments of the disclosure.

In some embodiments, the network optimizer may be implemented remote from the electronic devices 406-412 such as on a cloud or server configuration. In other embodiments, the network optimizer may be integrated into one or more of the electronic devices 406-412. Any of the system modules (e.g. network optimizer, data structure, electronic devices) may be any combination of shared or disparate hardware pieces that are communicatively coupled.

The electronic devices (e.g. device 1 (406), device 2 (408), device 3 (410), and device n (412)) may be any devices that have properties to transmit/receive network service data as well as having a secondary communication network (e.g. Bluetooth, Near Field Communication, service provider proprietary networks, or wired connection). The cooperating devices can include, but are not limited to, network-connected devices (e.g. Internet-of-Things devices), wearable devices, smartphones, tablets, laptops, personal computers, smart appliances, consumer electronics, industrial equipment, security systems, digital twin systems, and similar systems or any combination of these systems.

The data structure 402 is a database, server, or computing device that contains memory for receiving and transmitting data related to the network optimizer. Example data which may be stored in the data structure includes network coverage maps for various devices, historical device performance information, historical network performance information, geographical event data, historical apportioning of media assets, and other network/device/media asset-related information. The data structure may be cloud-based, integrated into the network optimizer, and/or integrated into one of the devices 406-412.

In some embodiments, the network optimizer may be communicatively connected to a user interface. The network optimizer may typically include processing circuitry, control circuitry, and storage (e.g. RAM, ROM, hard disk, removable disk, etc.). The network optimizer may also include an input/output ("I/O") path 506. I/O path 506 provides device information, or other data, over a local area network (LAN) or wide area network (WAN), and/or other content and data to control circuitry 504, which may incorporate processing circuitry 508 and storage 510. Control circuitry 504 may be used to send and receive commands, requests, signals (digital and analog), and other suitable data using I/O path 506. I/O path 506 connects control circuitry 504 (and specifically processing circuitry 508) to one or more communications paths.

Control circuitry 504 may be based on any suitable processing circuitry, such as processing circuitry 508. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g. dual-core, quad-core, hexa-core, or any suitable number of cores) or supercomputer. In some embodiments, processing circuitry may be distributed across multiple separate processors or processing units, for example, multiple of the same type of processing units (e.g. two Intel Core i7 processors) or multiple different processors (e.g. an Intel Core i5 processor and an Intel Core i7 processor). In some embodiments, control circuitry 504 executes instructions for a network optimizer stored in memory (e.g. storage 510).

Memory may be an electronic storage device provided as storage 510, which is part of control circuitry 504. As referred to herein, the phrase "electronic storage device" or "storage device" should be understood to mean any device for storing electronic data, computer software, or firmware, such as random-access memory, read-only memory, hard drives, solid state devices, quantum storage devices, or any other suitable fixed or removable storage devices, and/or any combination of the same. Nonvolatile memory may also be used (e.g. to launch a boot-up routine and other instructions).

The network optimizer 502 is coupled to a communications network. The communication network may be one or more networks including the Internet, a mobile phone network, mobile voice or data network (e.g. a 5G, 4G or LTE network), mesh network, peer-to-peer network, cable network, or other types of communications network or combinations of communications networks. The network optimizer may be coupled to a secondary communication network (e.g. Bluetooth, Near Field Communication, service provider proprietary networks, or wired connection) which connects it with the selected device for generation for playback. Paths may separately or together include one or more communications paths, such as a satellite path, a fiber-optic path, a cable path, a path that supports Internet communications, free-space connections (e.g. for broadcast or other wireless signals), or any other suitable wired or wireless communications path or combination of such paths.

Figure 6:
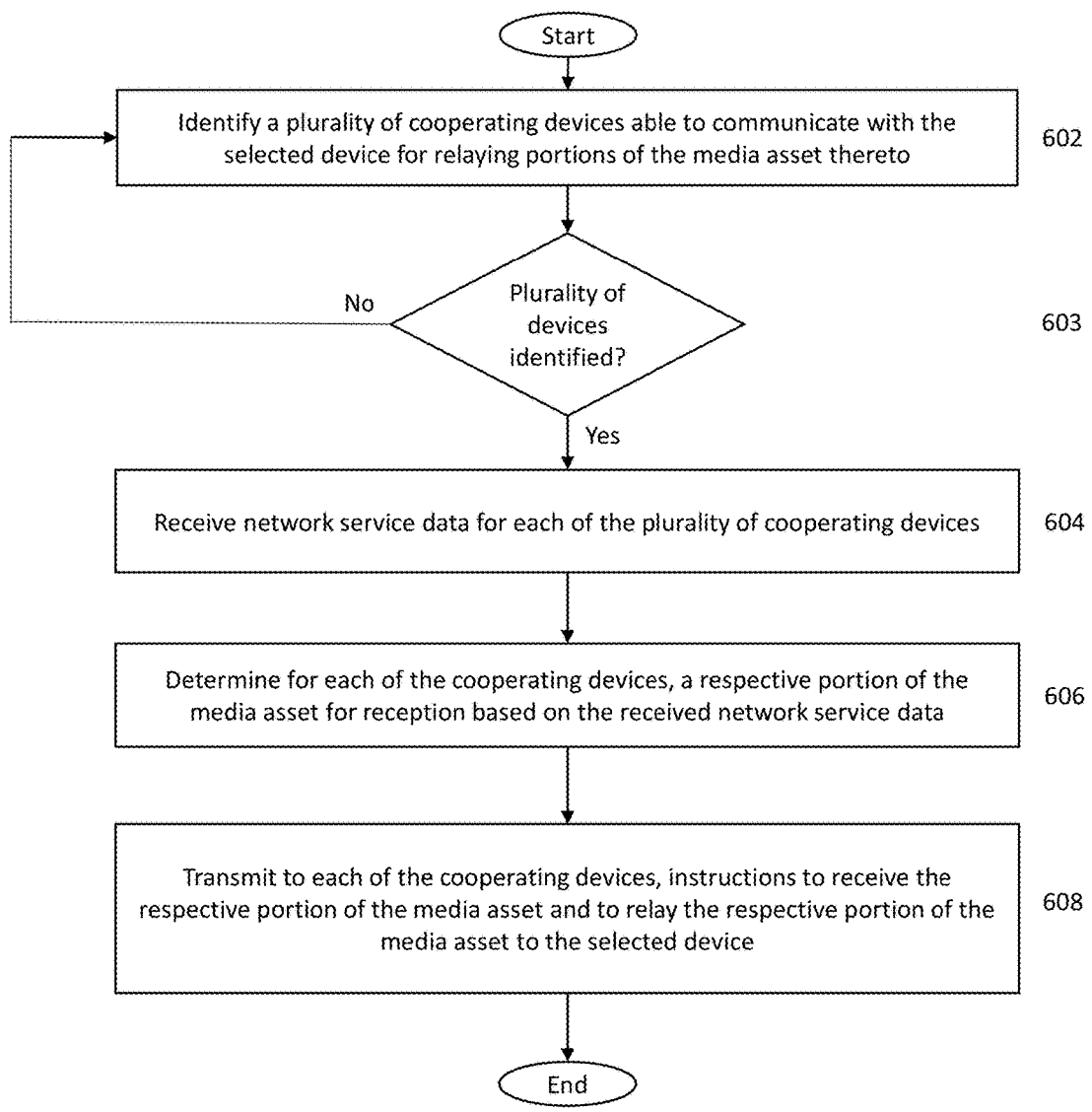
FIG. 6 is a flowchart of a process for determining portions of media assets for reception by multiple devices, in accordance with some embodiments.

FIG. 6 is a flowchart of a process for determining portions of media assets for reception by the cooperating devices, in accordance with some embodiments of the disclosure. Process 600, and any of the following processes, may be executed by control circuitry 504 (e.g. in a manner instructed to control circuitry 504 by the network optimizer). Control circuitry 504 may be part of network optimizer 502, a remote server connected with the network optimizer by way of a communication network or distributed over a combination of both.

At 602, the network optimizer 502, by control circuitry 504, identifies a plurality of cooperating devices able to communicate with the selected device for relaying portions of the media asset thereto. In some embodiments, the network optimizer uses the I/O path 506 to receive data from the plurality of devices. The I/O path 506 provides an interface to the devices 406-412 (e.g. wireless connection, Bluetooth, etc.). If, at 603, control circuitry fails to identify a plurality of cooperating devices "No", the process reverts to 602.

If, at 603, control circuitry determines that a plurality of cooperating devices has been identified "Yes", the process advances to 604. At 604, the network optimizer 502, by control circuitry 504, receives network service data for each of the plurality of cooperating devices. In some embodiments, the network optimizer 502 utilizes the I/O path 506 to retrieve the network data from the devices 406-412. In other embodiments, the network optimizer 502 utilizes the I/O path 506 to retrieve the network data from the data structure 402.

At 606, the network optimizer 502, by control circuitry 504, determines for each of the cooperating devices, a respective portion of the media asset for reception based on the received network service data. In some embodiments, the network optimizer 502 utilizes, at least in part, processing circuitry 508 to determine the respective portions of the media asset to be received by the cooperating devices based on the retrieved network data.

At 608, the network optimizer 502, by control circuitry 504, transmits to each device, instructions to receive the respective portion of the media asset and to relay the respective portion of the media asset to the selected device. In this embodiment, the network optimizer 502 utilizes the I/O path 506 to transmit the instructions to each device of the plurality of devices.

Figure 7:
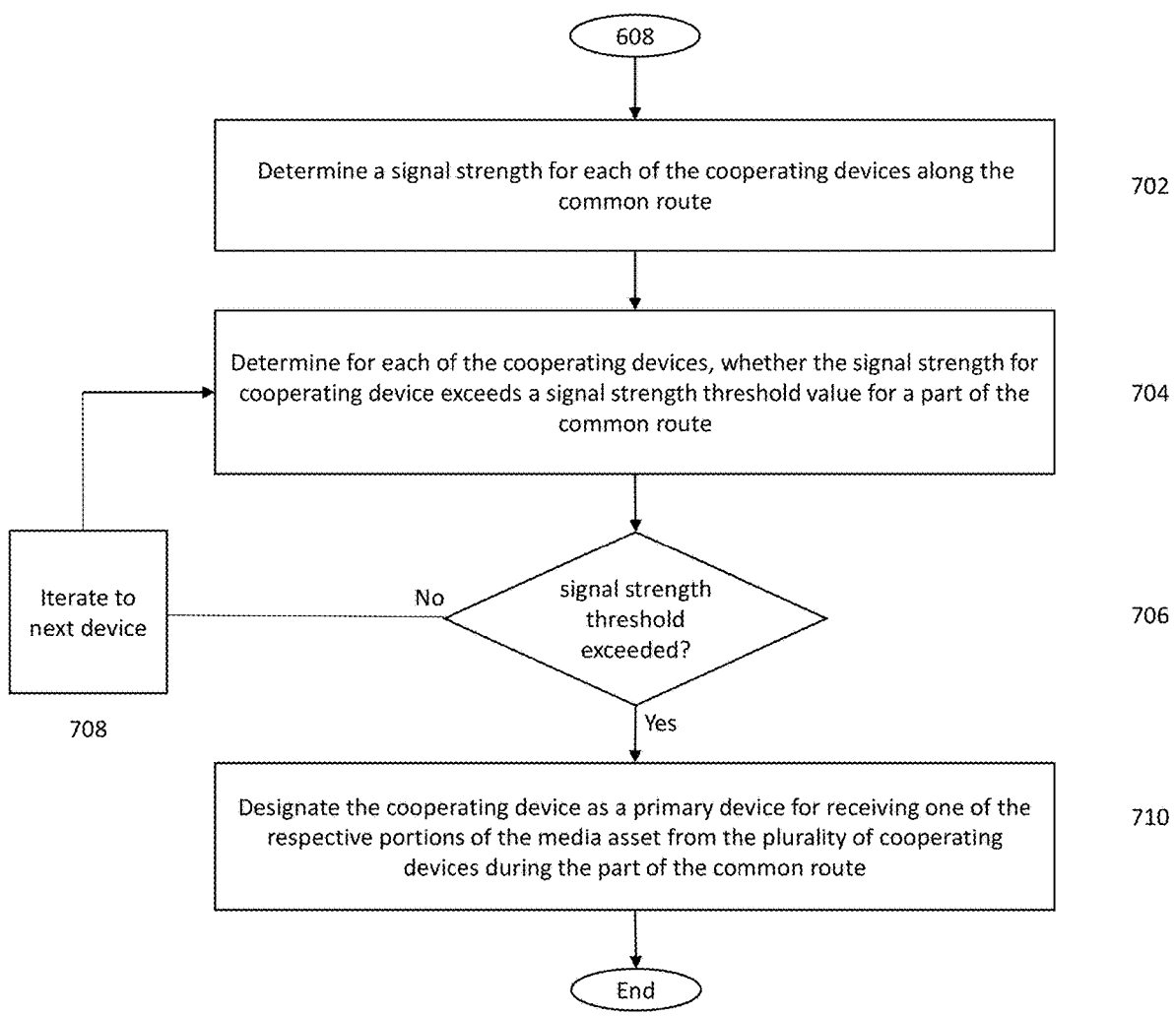
FIG. 7 is a flowchart of a process for designating a cooperating device as a primary device for receiving respective portions of the media asset from the cooperating devices during a part of the common route, in accordance with some embodiments.

FIG. 7 is a flowchart of a process 700 for designating a cooperating device as a primary device for receiving respective portions of the media asset from the cooperating devices during a part of the common route, in accordance with some embodiments of the disclosure. At 702, the network optimizer 502, by control circuitry 504, determines a signal strength for each of the cooperating devices along the common route. In this embodiment, the network optimizer receives network service data (containing signal strength) from the data structure 402 by the I/O path 506. In other embodiments, the network optimizer receives network service data (containing signal strength) from the devices 406-412 via the I/O path 506. In some embodiments, the network optimizer 502, by control circuitry 504, receives route data from the devices 406-412 via the I/O path 506. In some embodiments, the network optimizer 502 utilizes, at least in part, processing circuitry 508 to determines the signal strength for each of the cooperating devices along the common route.

At 704, the network optimizer 502, by control circuitry 504, determines for each of the cooperating devices, whether the signal strength for cooperating device exceeds a signal strength threshold value for a part of the common route. In some embodiments, the network optimizer 502, by control circuitry 504, receives the signal strength threshold value from the devices 406-412 via the I/O path 506. In other embodiments, the network optimizer 502, by control circuitry 504, receives the signal strength threshold value from the data structure 402 by the I/O path 506. In some embodiments, the network optimizer 502 utilizes, at least in part, processing circuitry 508 to determine for each of the cooperating devices, whether the signal strength for cooperating device exceeds a signal strength threshold value for a part of the common route. If, at 706, control circuitry determines that the signal strength threshold is not exceeded "No", the process advances to 708. At 708, the network optimizer 502, by control circuitry 504, iterates to the next device of the cooperating devices to determine whether the signal strength exceeds a signal strength threshold value for a part of the common route.

If, at 706, control circuitry determines that the signal strength threshold is exceeded "Yes", the process advances to 710. At 710, the network optimizer 502, by control circuitry 504, designates the cooperating device as a primary device for receiving one of the respective portions of the media asset from the plurality of cooperating devices during the part of the common route. In some embodiments, the network optimizer 502 utilizes the I/O path 506 to transmit the designation to the devices 406-412. In some embodiments, the network optimizer 502 utilizes, at least in part, processing circuitry 508 to designate the cooperating device as a primary device for receiving one of the respective portions of the media asset from the plurality of cooperating devices during the part of the common route.

Figure 8:
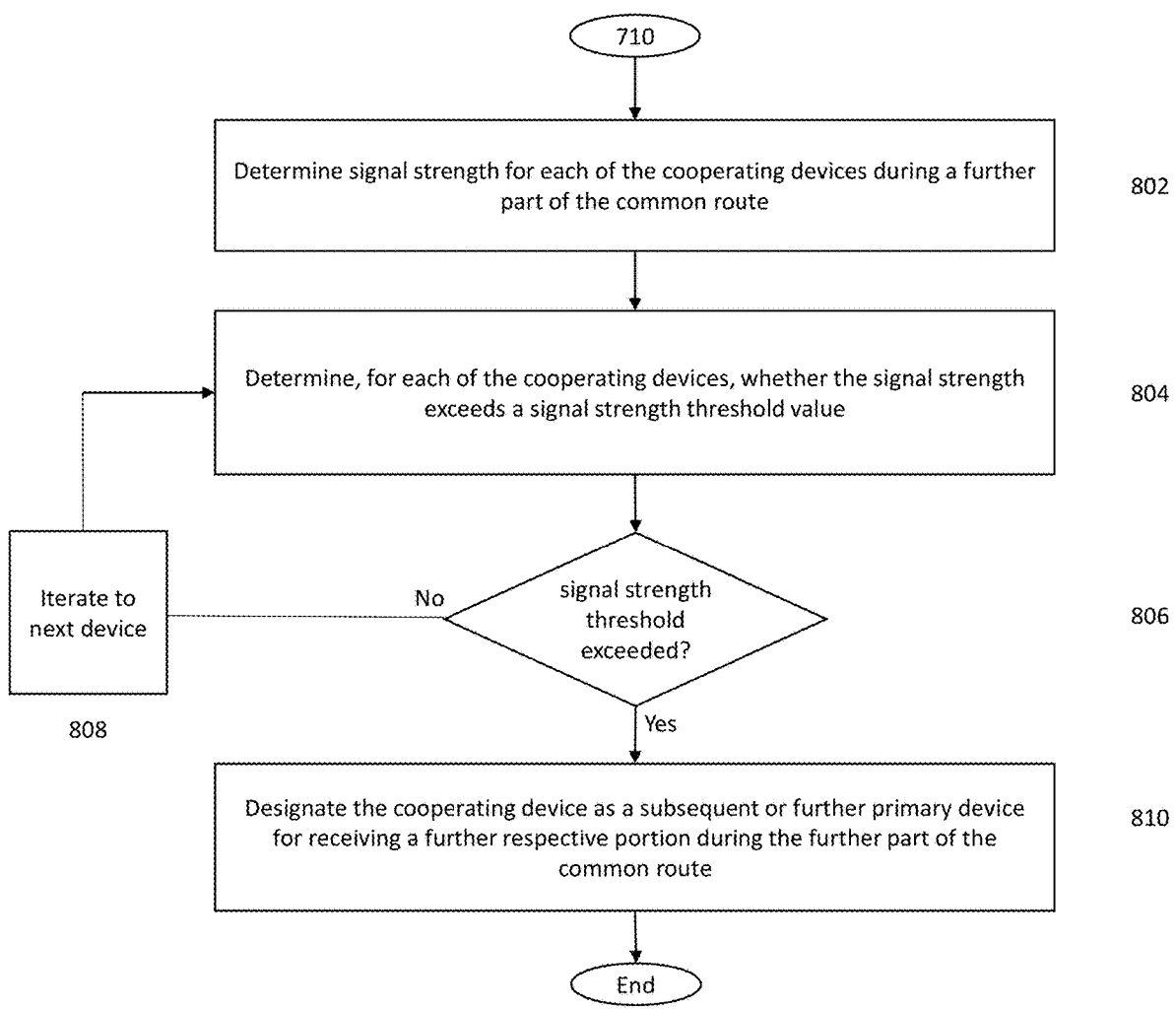
FIG. 8 is a flowchart of the process for designating the cooperating device as a further primary device for receiving a further respective portion during the further part of the common route, in accordance with some embodiments.

FIG. 8 is a flowchart of a process 800 for designating the cooperating device as a further primary device for receiving a further respective portion during the further part of the common route, in accordance with some embodiments of the disclosure. At 802, the network optimizer 502, by control circuitry 504, determines a signal strength for each of the cooperating devices during a further part of the common route. In this embodiment, the network optimizer receives network service data (containing signal strength) from the data structure 402 by the I/O path 506. In other embodiments, the network optimizer receives network service data (containing signal strength) from the devices 406-412 via the I/O path 506. In some embodiments, the network optimizer 502, by control circuitry 504, receives route data from the devices 406-412 via the I/O path 506. In some embodiments, the network optimizer 502 utilizes, at least in part, processing circuitry 508 to determines the signal strength for each of the cooperating devices during a further part of the common route.

At 804, the network optimizer 502, by control circuitry 504, determines for each of the cooperating devices, whether the signal strength for cooperating device exceeds a signal strength threshold value for a part of the common route. In some embodiments, the network optimizer 502, by control circuitry 504, receives the signal strength threshold value from the devices 406-412 via the I/O path 506. In other embodiments, the network optimizer 502, by control circuitry 504, receives the signal strength threshold value from the data structure 402 by the I/O path 506. In some embodiments, the network optimizer 502 utilizes, at least in part, processing circuitry 508 to determine for each of the cooperating devices, whether the signal strength for cooperating device exceeds a signal strength threshold value for a part of the common route. If, at 806, control circuitry determines that the signal strength threshold is not exceeded "No", the process advances to 808. At 808, the network optimizer 502, by control circuitry 504, iterates to the next device of the cooperating devices to determine whether the signal strength exceeds a signal strength threshold value for a part of the common route.

If, at 806, control circuitry determines that the signal strength threshold is exceeded "Yes", the process advances to 810. At 810, the network optimizer 502, by control circuitry 504, designates the cooperating device as a primary device for receiving one of the respective portions of the media asset from the plurality of cooperating devices during the part of the common route. In some embodiments, the network optimizer 502 utilizes the I/O path 506 to transmit the designation to the devices 406-412. In some embodiments, the network optimizer 502 utilizes, at least in part, processing circuitry 508 to designate the cooperating device as a primary device for receiving one of the respective portions of the media asset from the plurality of cooperating devices during the part of the common route.

It is contemplated that some suitable steps or suitable descriptions of FIGS. 6-8 may be used with other suitable embodiments of this disclosure. In addition, some suitable steps and descriptions described in relation to FIGS. 6-8 may be implemented in alternative orders or in parallel to further the purposes of this disclosure. For example, some suitable steps may be performed in any order or in parallel or substantially simultaneously to reduce lag or increase the speed of the system or method. Some suitable steps may also be skipped or omitted from the process. Furthermore, it should be noted that some suitable devices or equipment discussed in relation to FIGS. 4-5 could be used to perform one or more of the steps in FIGS. 6-8.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods. This Disclosure Covers Various Embodiments, Including the Following:

1. A method for determining portions of a media asset for reception on a selected device, comprising:
   identifying a plurality of cooperating devices able to communicate with the selected device for relaying portions of the media asset thereto;
   receiving network service data for each of the plurality of cooperating devices;
   determining, for each of the cooperating devices, a respective portion of the media asset for reception based on the received network service data; and
   transmitting, to each of the cooperating devices, instructions to receive the respective portion of the media asset and to relay the respective portion of the media asset to the selected device.

2. The method of item 1 in which the plurality of cooperating devices includes the selected device.

3. The method of item 1 or 2, wherein the method further comprises receiving a request for the media asset from the selected device, and wherein the selected device acts as a primary device for receiving a first one of the respective portions of the media asset.

4. The method of item 1, 2 or 3 wherein the plurality of cooperating devices is moving along a common route, the method further comprising accessing network service data for each of the plurality of cooperating devices along the common route.

5. The method of item 4, further comprising:
   determining a signal strength for each of the cooperating devices along the common route;
   determining, for each of the cooperating devices, whether the signal strength for the cooperating device exceeds a signal strength threshold value for a part of the common route; and
   in response to the determination that the signal strength for one of the cooperating devices exceeds the signal strength threshold value, designating the cooperating device as a primary device for receiving one of the respective portions of the media asset during the part of the common route.

6. The method of item 5, further comprising:
   determining signal strength for each of the cooperating devices during a further part of the common route;
   determining, for each of the cooperating devices, whether the signal strength exceeds a signal strength threshold value; and
   in response to the determination that the signal strength for one of the cooperating devices exceeds the signal strength threshold value, designating the cooperating device as a subsequent or further primary device for receiving a further respective portion during the further part of the common route.

7. The method of any preceding item, wherein a network optimizer transmits the instructions to each of the cooperating devices to receive the respective portion of the media asset and to relay the respective portion of the media asset to the selected device.

8. The method of any preceding item, wherein the portions of the media asset are received in at least partially temporally overlapping order by two or more of the cooperating devices as primary devices.

9. The method of any preceding item, wherein the plurality of cooperating devices is located within a close proximity determined by the range of a secondary communication network.

10. The method of item 9, wherein the secondary communication network comprises at least one of Bluetooth, Near Field Communication, service provider proprietary networks, ad-hoc wireless connection, or wired connection.

11. A system for determining portions of a media asset for reception on a selected device, comprising:
    control circuitry configured to:
    identify a plurality of cooperating devices able to communicate with the selected device for relaying portions of the media asset thereto;
    receive network service data for each of the plurality of cooperating devices;
    determine, for each of the cooperating devices, a respective portion of the media asset for reception based on the received network service data; and
    transmit, to each of the cooperating devices, instructions to receive the respective portion of the media asset and to relay the respective portion of the media asset to the selected device.

12. The system of item 11, wherein the plurality of cooperating devices includes the selected device.

13. The system of item 11 or 12, wherein the control circuitry is further configured to receive a request for the media asset from the selected device, and wherein the selected device acts as a primary device for receiving a first one of the respective portions of the media asset.

14. The system of items 11, 12, or 13, wherein control circuitry is further configured, when the plurality of cooperating devices is moving along a common route, to access network service data for each of the plurality of cooperating devices along the common route.

15. The system of item 14, wherein the control circuitry is further configured to:
    determine a signal strength for each of the cooperating devices along the common route;
    determine, for each of the cooperating devices, whether the signal strength for the cooperating device exceeds a signal strength threshold value for a part of the common route; and
    in response to the determination that the signal strength for one of the cooperating devices exceeds the signal strength threshold value, designate the cooperating device as a primary device for receiving one of the respective portions of the media asset during the part of the common route.

16. The system of item 15, wherein the control circuitry is further configured to:
    determine signal strength for each of the cooperating devices during a further part of the common route;
    determine, for each of the cooperating devices, whether the signal strength exceeds a signal strength threshold value; and
    in response to the determination that the signal strength for one of the cooperating devices exceeds the signal strength threshold value, designate the cooperating device as a subsequent or further primary device for receiving a further respective portion during the further part of the common route.

17. The system of any preceding item, wherein a network optimizer transmits the instructions to each of the cooperating devices to receive the respective portion of the media asset and to relay the respective portion of the media asset to the selected device.

18. The system of any preceding item, wherein the portions of the media asset are received in at least partially temporally overlapping order by two or more of the cooperating devices as primary devices.

19. The system of any preceding item, wherein the plurality of cooperating devices is located within a close proximity determined by the range of a secondary communication network.

20. The system of item 19, wherein the secondary communication network comprises at least one of Bluetooth, Near Field Communication, service provider proprietary networks, ad-hoc wireless connection, or wired connection.

21. A system for determining portions of a media asset for reception on a selected device, comprising:
    means for identifying a plurality of cooperating devices able to communicate with the selected device for relaying portions of the media asset thereto;
    means for receiving network service data for each of the plurality of cooperating devices;
    means for determining, for each of the cooperating devices, a respective portion of the media asset for reception based on the received network service data; and
    means for transmitting, to each of the cooperating devices, instructions to receive the respective portion of the media asset and to relay the respective portion of the media asset to the selected device.

22. The system of item 21 in which the plurality of cooperating devices includes the selected device.

23. The system of item 21 or 22, wherein the system further comprises receiving a request for the media asset from the selected device, and wherein the selected device acts as a primary device for receiving a first one of the respective portions of the media asset.

24. The system of item 21, 22 or 23 wherein the plurality of cooperating devices is moving along a common route, the system further comprises means for accessing network service data for each of the plurality of cooperating devices along the common route.

25. The system of item 24, further comprising:
    means for determining a signal strength for each of the cooperating devices along the common route;
    means for determining, for each of the cooperating devices, whether the signal strength for the cooperating device exceeds a signal strength threshold value for a part of the common route; and
    means for, in response to the determination that the signal strength for one of the cooperating devices exceeds the signal strength threshold value, designating the cooperating device as a primary device for receiving one of the respective portions of the media asset during the part of the common route.

26. The system of item 25, further comprising:
    means for determining signal strength for each of the cooperating devices during a further part of the common route;
    means for determining, for each of the cooperating devices, whether the signal strength exceeds a signal strength threshold value; and
    means for, in response to the determination that the signal strength for one of the cooperating devices exceeds the signal strength threshold value, designating the cooperating device as a subsequent or further primary device for receiving a further respective portion during the further part of the common route.

27. The system of any preceding item, wherein a network optimizer transmits the instructions to each of the cooperating devices to receive the respective portion of the media asset and to relay the respective portion of the media asset to the selected device.

28. The system of any preceding item, wherein the portions of the media asset are received in at least partially temporally overlapping order by two or more of the cooperating devices as primary devices.

29. The system of any preceding item, wherein the plurality of cooperating devices is located within a close proximity determined by the range of a secondary communication network.

30. The system of item 29, wherein the secondary communication network comprises at least one of Bluetooth, Near Field Communication, service provider proprietary networks, ad-hoc wireless connection, or wired connection.

31. A non-transitory computer readable medium having instructions encoded thereon, that when executed by control circuitry causes the control circuitry to:
    identify a plurality of cooperating devices able to communicate with the selected device for relaying portions of the media asset thereto;
    receive network service data for each of the plurality of cooperating devices;
    determine, for each of the cooperating devices, a respective portion of the media asset for reception based on the received network service data; and
    transmit, to each of the cooperating devices, instructions to receive the respective portion of the media asset and to relay the respective portion of the media asset to the selected device.

32. The non-transitory computer-readable medium of item 31, wherein the plurality of cooperating devices includes the selected device.

33. The non-transitory computer-readable medium of items 31 or 32, wherein the instructions further cause the control circuitry to further receive a request for the media asset from the selected device, and wherein the selected device acts as a primary device for receiving a first one of the respective portions of the media asset.

34. The non-transitory computer-readable medium of items 31, 32, or 33, wherein the instructions further cause the control circuitry, when the plurality of cooperating devices is moving along a common route, to access network service data for each of the plurality of cooperating devices along the common route.

35. The non-transitory computer-readable medium of item 34, the instructions further cause the control circuitry to:
    determine a signal strength for each of the cooperating devices along the common route;
    determine, for each of the cooperating devices, whether the signal strength for the cooperating device exceeds a signal strength threshold value for a part of the common route; and
    in response to the determination that the signal strength for one of the cooperating devices exceeds the signal strength threshold value, designate the cooperating device as a primary device for receiving one of the respective portions of the media asset during the part of the common route.

36. The non-transitory computer-readable medium of item 35, wherein the instructions further cause the control circuitry to:
   determine signal strength for each of the cooperating devices during a further part of the common route;
   determine, for each of the cooperating devices, whether the signal strength exceeds a signal strength threshold value; and
   in response to the determination that the signal strength for one of the cooperating devices exceeds the signal strength threshold value, designate the cooperating device as a subsequent or further primary device for receiving a further respective portion during the further part of the common route.

37. The non-transitory computer-readable medium of any preceding item, wherein a network optimizer transmits the instructions to each of the cooperating devices to receive the respective portion of the media asset and to relay the respective portion of the media asset to the selected device.

38. The non-transitory computer-readable medium of any preceding item, wherein the portions of the media asset are received in at least partially temporally overlapping order by two or more of the cooperating devices as primary devices.

39. The non-transitory computer-readable medium of any preceding item, wherein the plurality of cooperating devices is located within a close proximity determined by the range of a secondary communication network.

40. The non-transitory computer-readable medium of item 39, wherein the secondary communication network comprises at least one of Bluetooth, Near Field Communication, service provider proprietary networks, ad-hoc wireless connection, or wired connection.

What is claimed is:

1. A method comprising:
   identifying a plurality of cooperating devices, wherein the cooperating devices are located in a common area in proximity of each other;
   identifying signal strength of network service for each of the plurality of cooperating devices in the common area;
   determining, for each of the cooperating devices, a respective portion of a media asset for reception based on the identified signal strength in the common area;
   determining, for each of the cooperating devices, whether the signal strength for the cooperating device exceeds a signal strength threshold value in the common area;
   in response to determining that the signal strength of one of the cooperating devices exceeds the signal strength threshold value at the common area, designating that cooperating device as a primary device for receiving one of the respective portions of the media asset in the common area; and
   transmitting, to each of the cooperating devices, instructions to receive the respective portion of the media asset and to relay the respective portion of the media asset to the designated device.

2. The method of claim 1, wherein the plurality of cooperating devices includes the designated device.

3. The method of claim 1, wherein the method further comprises receiving a request for the media asset from the designated device, and wherein the designated device acts as the primary device for receiving a first one of the respective portions of the media asset.

4. The method of claim 1, wherein a network optimizer transmits the instructions to each of the cooperating devices to receive the respective portion of the media asset and to relay the respective portion of the media asset to the designated device.

5. The method of claim 1, wherein the portions of the media asset are received in at least partially temporally overlapping order by two or more of the cooperating devices as primary devices.

6. A system for determining portions of a media asset for reception on a designated device, comprising control circuitry configured to:
   identify a plurality of cooperating devices, wherein the cooperating devices are located in a common area in proximity of each other;
   identify signal strength of network service for each of the plurality of cooperating devices in the common area;
   determine, for each of the cooperating devices, a respective portion of a media asset for reception based on the identified signal strength in the common area;
   determine, for each of the cooperating devices, whether the signal strength for the cooperating device exceeds a signal strength threshold value in the common area;
   in response to determining that the signal strength of one of the cooperating devices exceeds the signal strength threshold value at the common area, designate that cooperating device as a primary device for receiving one of the respective portions of the media asset in the common area; and
   transmit, to each of the cooperating devices, instructions to receive the respective portion of the media asset and to relay the respective portion of the media asset to the designated device.

7. The system of claim 6, wherein the plurality of cooperating devices includes the designated device.

8. The system of claim 6, wherein the control circuitry is further configured to receive a request for the media asset from the designated device, and wherein the designated device acts as the primary device for receiving a first one of the respective portions of the media asset.

9. The system of claim 6, wherein a network optimizer transmits the instructions to each of the cooperating devices to receive the respective portion of the media asset and to relay the respective portion of the media asset to the designated device.

10. The system of claim 6, wherein the portions of the media asset are received in at least partially temporally overlapping order by two or more of the cooperating devices as primary devices.

11. A non-transitory computer readable medium having instructions encoded thereon, that when executed by control circuitry causes the control circuitry to:
   identify a plurality of cooperating devices, wherein the cooperating devices are located in a common area in proximity of each other;
   identify signal strength of network service for each of the plurality of cooperating devices in the common area;
   determine, for each of the cooperating devices, a respective portion of a media asset for reception based on the identified signal strength in the common area;
   determine, for each of the cooperating devices, whether the signal strength for the cooperating device exceeds a signal strength threshold value in the common area;
   in response to determining that the signal strength of one of the cooperating devices exceeds the signal strength threshold value at the common area, designate that cooperating device as a primary device for receiving one of the respective portions of the media asset in the common area; and transmit, to each of the cooperating devices, instructions to receive the respective portion of the media asset and to relay the respective portion of the media asset to the designated device.

12. The non-transitory computer-readable medium of claim 11, wherein the plurality of cooperating devices includes the designated device.

13. The non-transitory computer-readable medium of claim 11, wherein the instructions further cause the control circuitry to further receive a request for the media asset from the designated device, and wherein the designated device acts as the primary device for receiving a first one of the respective portions of the media asset.

14. The non-transitory computer-readable medium of claim 11, wherein a network optimizer transmits the instructions to each of the cooperating devices to receive the respective portion of the media asset and to relay the respective portion of the media asset to the designated device.

15. The non-transitory computer-readable medium of claim 11, wherein the portions of the media asset are received in at least partially temporally overlapping order by two or more of the cooperating devices as primary devices.

* * * * *